(12) United States Patent
Landry et al.

(10) Patent No.: US 12,345,794 B2
(45) Date of Patent: Jul. 1, 2025

(54) DISTRIBUTED CLOCK SYSTEM FOR THE SYNCHRONIZATION OF INSTRUMENTATION

(71) Applicant: The Government of the United States of America, as represented by the Secretary of the Navy, Arlington, VA (US)

(72) Inventors: Blake J. Landry, Saint Martinville, LA (US); Charles R. Key, Diamondhead, MS (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 700 days.

(21) Appl. No.: 17/491,902

(22) Filed: Oct. 1, 2021

(65) Prior Publication Data

US 2022/0107401 A1    Apr. 7, 2022

Related U.S. Application Data

(60) Provisional application No. 63/086,761, filed on Oct. 2, 2020.

(51) Int. Cl.
| | |
|---|---|
| *G01S 11/08* | (2006.01) |
| *G01S 19/24* | (2010.01) |
| *G01S 19/39* | (2010.01) |
| *G04G 5/00* | (2013.01) |

(Continued)

(52) U.S. Cl.
CPC .............. *G01S 11/08* (2013.01); *G01S 19/24* (2013.01); *G01S 19/39* (2013.01); *G04G 5/00* (2013.01); *G04G 7/00* (2013.01); *G04R 20/02* (2013.01)

(58) Field of Classification Search
CPC .......... G01S 11/08; G01S 19/24; G01S 19/39; G04G 5/00; G04G 7/00; G04R 20/02
See application file for complete search history.

(56) References Cited

U.S. PATENT DOCUMENTS

| | | | | |
|---|---|---|---|---|
| 6,081,229 | A | * 6/2000 | Soliman | G01S 5/021 |
| | | | | 701/503 |
| 7,616,716 | B2 | 11/2009 | Beach et al. | |
| 7,975,160 | B2 | 7/2011 | Smith et al. | |

(Continued)

*Primary Examiner* — Edwin A. Leon
*Assistant Examiner* — Sean R Brannon
(74) *Attorney, Agent, or Firm* — US Naval Research Laboratory; Nigel R. Fontenot

(57) ABSTRACT

A method for a distributed clock system (DCS) device that includes receiving a GPS signal, determining that a first current time equals a predetermined start time, and generating a shifted GPS signal by applying a configurable delay to the received GPS signal, the shifted GPS signal alternating between a low value and a high value. The method includes responsive to a falling edge of the shifted GPS signal, generating an ARM signal having a rising edge after a falling edge of the shifted GPS signal, and responsive to the ARM signal being high and the shifted GPS signal being high, generating an output enable signal. The method includes transmitting, while the output enable signal is high, a triggering signal, the triggering signal having one or more synchronizing pulses that cause one or more sampling devices to sample data according to the frequency associated with the raw clock signal.

20 Claims, 7 Drawing Sheets

(51) Int. Cl.
   *G04G 7/00*      (2006.01)
   *G04R 20/02*     (2013.01)

(56) References Cited

U.S. PATENT DOCUMENTS

| | | | |
|---|---|---|---|
| 8,643,540 | B2 | 2/2014 | Pattabiraman et al. |
| 9,614,514 | B2 | 4/2017 | Onodera |
| 10,587,704 | B2 * | 3/2020 | Gottumukkala ...... H04J 3/0635 |
| 10,915,484 | B2 | 2/2021 | Nevalainen et al. |
| 11,018,658 | B1 | 5/2021 | Jeon |
| 2018/0029092 | A1 | 2/2018 | Burrage et al. |
| 2020/0064861 | A1 * | 2/2020 | Zhang .................... G01S 19/13 |

* cited by examiner

DISTRIBUTED CLOCK SYSTEM FOR THE SYNCHRONIZATION OF INSTRUMENTATION

CROSS-REFERENCE

This Application is a nonprovisional application of and claims the benefit of priority under 35 U.S.C. § 119 based on U.S. Provisional Patent Application No. 63/086,761 filed on Oct. 2, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #109643.

TECHNICAL FIELD

The present disclosure is related to a Distributed Clock System (DCS), and more specifically to (but not limited to) one or more DCS devices providing the ability to collect synchronized data from a spatially distributed sensor device network.

BACKGROUND

Traditional methods of synchronization require running multiple cables from a single function generator (or device that can generate a transistor to transistor logic (TTL) signal) to each instrument. However, due to equipment/setup/environmental constraints and/or required distances between devices, running cables to sampling devices may be prohibited. Long cables can cause signal attenuation and reflections due to transmission line effects. In addition, cable length differences can cause differences of arrival time due, which can impact clock signal integrity. The larger the spatial distribution, the larger these sources of error. Additionally, if independent TTL signal generation device are used (for example, a Single Board Computer like a Raspberry Pi), the system can be prone to clock drift as sampling duration increases, greatly impacting synchronization between sampling devices.

Thus, there exists a need for a solution to provide the ability to collect synchronized data from a spatially distributed sensor network while avoiding clock drift during sampling sessions.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The Distributed Clock System (DCS) was developed by the Naval Research Laboratory (NRL) to assist with the synchronization of similar or disparate data acquisition systems, which were often located too far apart to make a physical connection convenient.

Each DCS unit can contain a single-board computer and a GPS receiver. A DCS unit, can be synchronized to GPS time. For example, the clock can maintain synchronization with the GPS Pulse-Per-Second (PPS) signal, so that disconnected DCS units share a high-precision time-base, with synchronization unaffected by the physical distance between units. At a specified time, spatially distributed DCS units begin producing transistor to transistor logic (TTL) level pulses on an output terminal at a specified rate/frequency. This output can in turn be used to trigger and/or pace the sampling of other data acquisition systems coupled to a respective DCS unit. Accordingly, the DCS unit can be used to trigger physically separated data acquisition systems.

The present disclosure provides for a method for operating a distributed clock system (DCS) device. The method may include receiving, by a Global Positioning System (GPS) timing receiving circuit of the distributed clock system (DCS) device, a GPS signal from a GPS source, the GPS signal indicating time including a current time, the GPS signal alternating between a low value and a high value, wherein the GPS signal has a frequency lower than a frequency of a raw clock signal. The method may include determining, by the GPS timing receiving circuit and based on the received GPS signal, that a first current time equals a predetermined start time, and generating, by the GPS timing receiving circuit, a shifted GPS signal by applying a configurable delay to the received GPS signal, the shifted GPS signal alternating between a low value and a high value. The method may include responsive to a falling edge of the shifted GPS signal, generating, by an arming circuit of the DCS device, an ARM signal having a rising edge after a falling edge of the shifted GPS signal, and responsive to the ARM signal being high and the shifted GPS signal being high, generating, by an output enabling circuit of the DCS device, an OUTPUT ENABLE signal. The method may include transmitting, by a generator circuit of the DCS device, while the OUTPUT ENABLE signal is high, a triggering signal to one or more sampling devices, the triggering signal comprising one or more synchronizing pulses that cause the one or more sampling devices to sample data according to the frequency associated with the raw clock signal.

The present disclosure provides for a method of operating a plurality distributed clock system (DCS) computing devices. The method may include obtaining, by a plurality of distributed clock system (DCS) computing devices, Global Positioning System (GPS) timing information providing a current time, and receiving, by each of the plurality of DC computing systems, a start time value, the start time value being based on the GPS timing information. The method may include generating, by each of the DCS computing devices, a shifted GPS signal by applying a configurable delay to the received GPS timing information, and arming, based on the shifted GPS signal, each of plurality DCS computing devices to begin transmitting a triggering signal to one or more sampling devices, the triggering signal comprising one or more synchronizing pulses. The method may include responsive to the current time matching the received start time value, transmitting, by each of the plurality of DCS computing devices, the triggering signal to the one or more sampling devices, wherein the triggering signal causes the one or more sampling devices to sample data according a frequency associated with a common clock signal.

The present disclosure provides for a distributed clock system (DCS) device. The DCS device may include a Global Positioning System (GPS) timing receiving circuit configured to receive a GPS signal from a GPS source, the GPS signal indicating time including a current time, the GPS signal alternating between a low value and a high value, wherein the GPS signal has a frequency lower than a frequency of a raw clock signal, determine that a first current time equals a predetermined start time, and generate a shifted GPS signal by applying a configurable delay to the received GPS signal, the shifted GPS signal alternating between a low value and a high value. The DCS device may include an arming circuit configured to generate, responsive to a falling edge of the shifted GPS signal, an ARM signal having a rising edge after a falling edge of the shifted GPS signal. The DCS device may include an output enabling circuit configured to generate, responsive to the ARM signal being high and the shifted GPS signal being high an OUTPUT ENABLE signal. The DCS device may include a generator circuit configured to transmit, while the OUTPUT ENABLE signal is high, a triggering signal to one or more sampling devices, the triggering signal comprising one or more synchronizing pulses that cause the one or more sampling devices to sample data according to the frequency associated with the raw clock signal.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present disclosure provides for embodiments of a Distributed Clock System (DCS) and operation thereof.

The ability to collect synchronized data from a spatially distributed sensor network is important for field and laboratory experiments over a broad range of engineering, scientific, and defense applications. The present disclosure provides for a newly developed Distributed Clock System (DCS), which can include one or more nodal units or boxes that may provide GPS time-based aligned trigger signals (single and differential) at user-defined frequencies for each unit.

Figure 1:
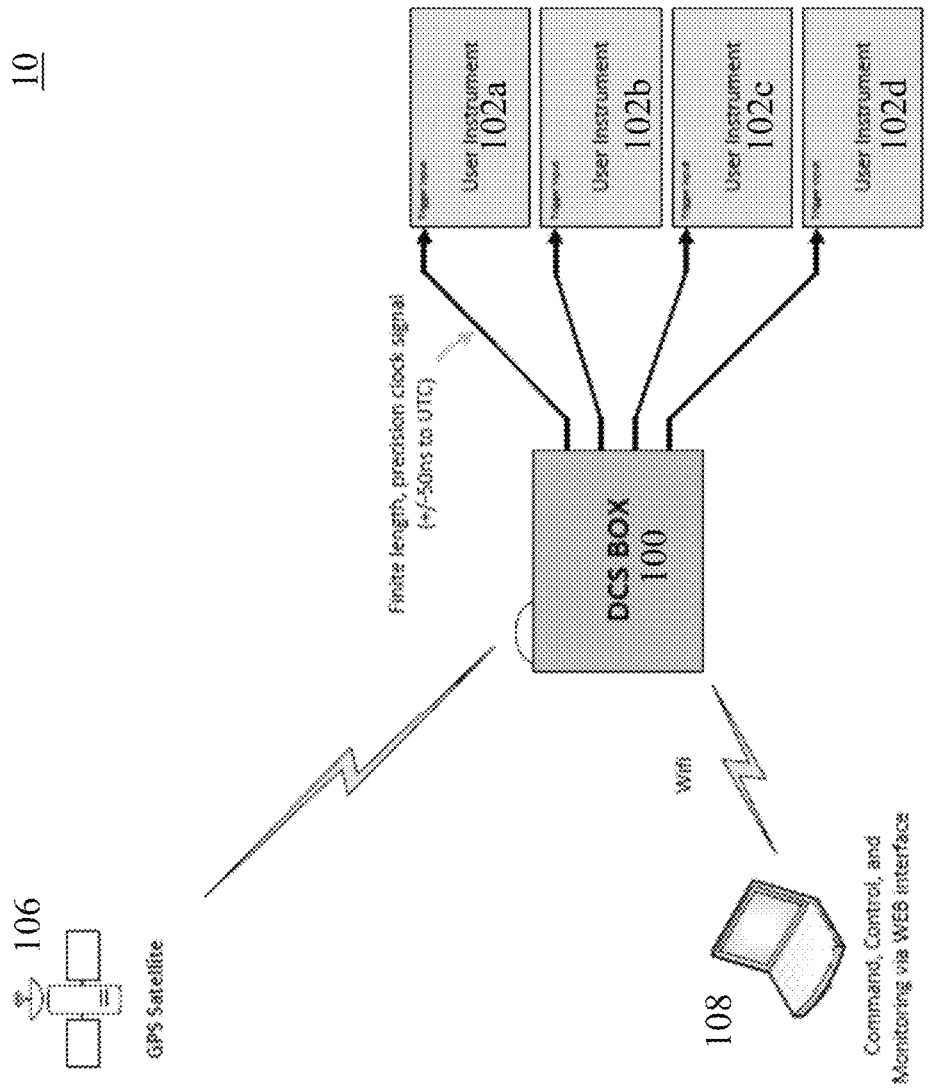
FIG. 1 illustrates an exemplary block diagram of an embodiment of a distributed clock system (DCS), in accordance with disclosed aspects.

FIG. 1 illustrates an exemplary block diagram of an embodiment of a distributed clock system (DCS) 10. The DCS system 10 may include a DCS device 100, which may be coupled to and/or communicate with one or more devices, instruments, or sensors 102a-102d, such as via wireless communication, wired cables, etc. According to some aspects, the DCS device 100 may send triggering pulses to the one or more devices 102a-d, which may instruct and/or cause the devices 102a-d to sample data according to the frequency of the triggering pulses.

The DCS device 100 may be coupled to a web interfacing computing system 108, which may be used to interact with the DCS device 100, such as to communicate with the DCS device 100, such as via wireless communication, wired cables, etc. For example, the interfacing computing system 108 may receive and/or transmit user input or instructions that may be used to control and/or operate a DCS device 100. The user input may include, for example, a predetermined start or end time for when the DCS device 100 might instruct an instrument 102a-d to begin or end sampling, a frequency of a triggering pulse signal, and the like. According to some aspects, the interfacing computer system 108 may be integral with the DCS device 100.

According to some aspects, the interfacing computing system 108 may be a second DCS device 100 connected to one or more other DCS device 100. In this way, the second DCS device 100 may act as a parent node to other child nodes DCS devices 100. According to some aspects, the parent node DCS device 100 may still function in accordance with described aspects, and may be configured to send instructions to other devices and DCS device 100.

The DCS device 100 may be coupled to and/or communicate with a time or timing source. For example, DCS device 100 may receive timing signals from a Global Positioning System (GPS) source, such as GPS satellite 106, shown in FIG. 1. For example, the DCS system 10 may leverage a GPS PPS (Global Positioning System Pulse per Second) signal to edge align the time of one or more DCS devices 100 to the second every second (or at some other interval or frequency).

According to some aspects, the circuitry of the DCS device 100 may be configured to generate user-specified triggering pulses for instruments 102a-d by, for example, clock dividing the GPS PPS signal, allowing the user to specify a desired sampling rate (e.g., ranging from 1000 Hz to once per year, and the like). This allows the DCS device 100 to provide accurate and precise time synchronization to the devices 102a-d, and in some cases, without the use of cables, which may enable easier and rapid deployment over longer distances. The interfacing computing system 108 may provide for a user to program and/or instruct a DCS device 100 for a precise start, and/or end time for the clock outputs (to the devices 102a-d). The DCS device 100 may leverage the precision of the GPS PPS signal to edge align the taking of samples on one or more (or all) spatially distributed sensors to within a negligible degree of accuracy (e.g., tens of nanoseconds).

Figure 2:
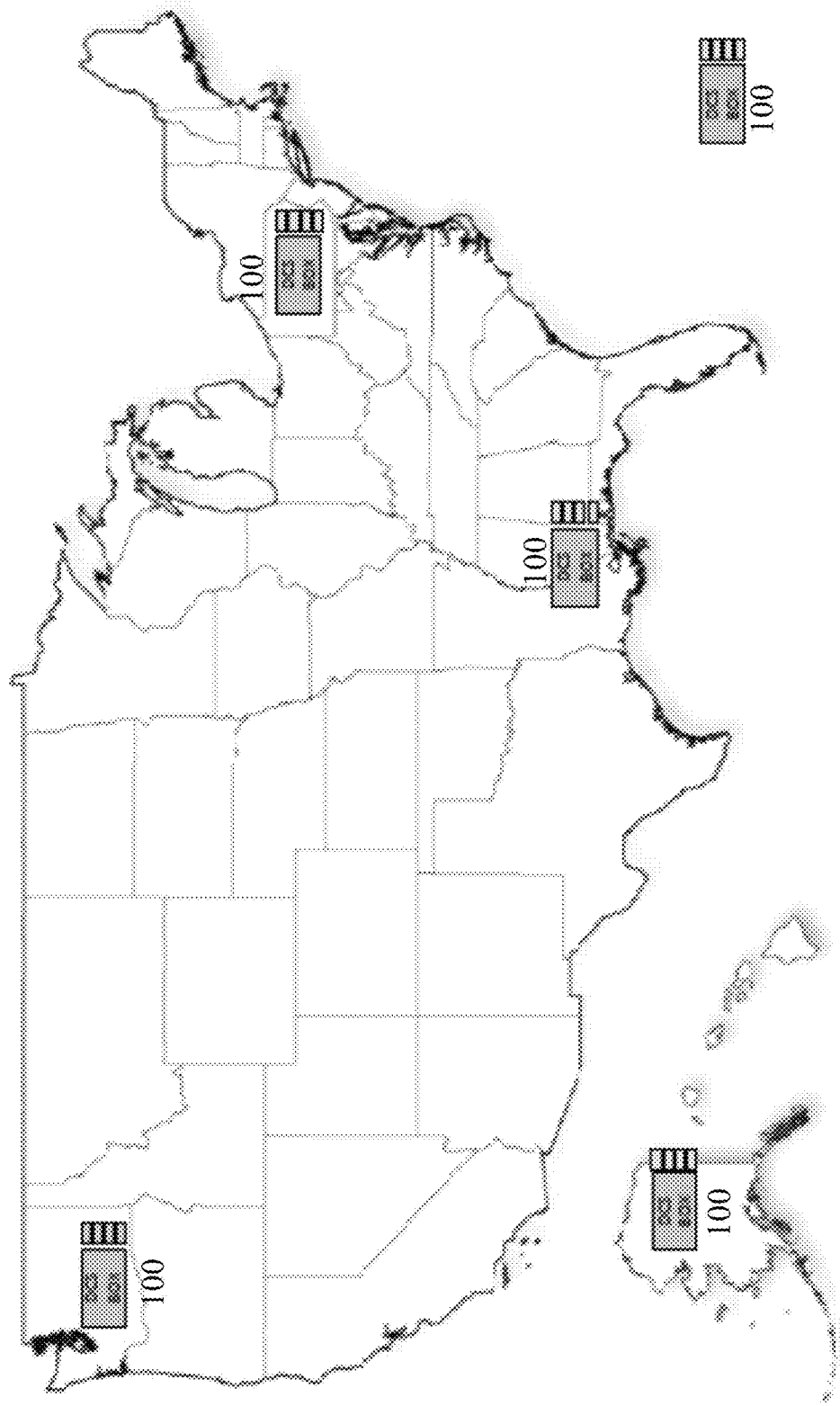
FIG. 2 is a schematic illustrating an embodiment of an exemplary geographic layout of spatially distributed DCS devices, in accordance with disclosed aspects.

FIG. 2 is a schematic illustrating an exemplary geographic layout of spatially distributed DCS devices 100, which may be located at different geographical locations. According to disclosed aspects, spatial distribution has no effect on timing accuracy. A DCS device 100 may be integrated into small carrying cases for protection and ease of transport and deployment, which may be anywhere around the world and/or anywhere where a GPS signal is available. Interfacing computing system 108 may send instructions to remotely arm one or more of the DCS devices 100, such as via a network connection (e.g., wireless, direct cable, etc.) to start sending triggering pulses at a predetermined future time. For example, the plurality of DCS devices 100 may trigger one or more connected devices 102a to all begin sampling data in accordance with a common clock signal (e.g., sample at a frequency of a common clock signal—sample on pulse).

In some cases, a triggering pulse may trigger one or more connected devices 102a to start sampling at a common time based the triggering pulse. For example, after receiving this starting triggering pulse, the one or more connected devices 102a may sample according to a respective clock signal for each of the one or more connected devices 102a (e.g., the internal clock of the respective connected device). In this manner, the triggering pulse may act as a starting pulse for the one or more connected devices 102a (e.g., start on pulse). In some embodiments, the start on pulse may include the one or more connected devices 102a starting after the first pulse and ignoring the other pulses in the pulse train of a plurality of triggering pulses.

As stated above, the interfacing computing system 108 may be a second DCS device 100 connected to one or more other DCS device 100, acting as a parent node to other child nodes, and may still maintain operation in accordance with aspects described herein for the DCS device 100. Accordingly, one of the DCS devices 100 can serve as a "parent" node and control one or more of the "children" nodes on the same network. The DCS devices 100 can, for example, be accessed directly by a communication port on the device 100, via a web-based interface for each individual device 100, and/or from the "parent" device 100.

After arming, the DCS devices 100 may begin sending triggering pulses one or more respectively connected sensors 102a-d. In this way, a plurality of DCS devices 100 may be deployed over a geographical area and may all be synchronized for collecting temporally-aligned sampled data, such as environmental data or other measurements, from respective sensors 102a-d used in the field (e.g., velocity meters, water level sensors, camera, etc.). Each of the DCS devices 100 may be respectively connected to one or more sensing devices 102a-d, which may be configured to sample data based on instructions received from the respective DCS device 100.

DCS provides for a solution to align data sampling in both field and laboratory settings. In some embodiments, the DCS system 10 may be extended for use within a more local area (e.g., park, stadium, arena, etc.), such as an indoor facility. For example, a plurality of DCS devices 100 may be installed in different spatial locations at and/or within a building. Each DCS device 100 may receive GPS timing information from a respective GPS source. For example, one or more of the DCS devices 100 may include a GPS antenna and/or GPS repeater to receive a GPS signal from a GPS source (e.g., satellite) and acquire a temporal GPS lock for determining and setting a timing scheme (discussed below in more detail). In some cases, one or more of the DCS devices 100 may directly communicate with the GPS satellite to acquire timing information. This adaptability allows the DCS devices 100 to be synchronized for collecting temporally-aligned data from respectively connected sensors at and/or within the building.

The DCS devices 100 can include an antenna, such as an embedded or an attached antenna, such as on a housing or front panel of a DCS device 100. In some cases, a DCS device 100 can include external antenna can allow the units to work within a building where a GPS signal might not be able to be received from a GPS satellite (e.g., because of signal loss). In some cases, using the DCS devices 100 indoors may include leveraging a GPS repeater to broadcast the GPS signal indoors. For example, in a test example of the DCS system 10, a GPS repeater was installed on a wall of a wave basin building to ensure that all DCS devices 100 worked inside of the steel structure. A nested parent-child synchronization scheme was adopted, with the DCS devices 100 triggering all stationary systems, with an infrared sync used to trigger the DAQ on the free-running model. It should be noted that while all systems begin synchronously, most of the sample clocks are left "free-running." This introduces a possibility of clock drift, but this was judged to be negligibly over the active sampling time (10-20 minutes) of the tests being conducted in this example.

Figure 3:
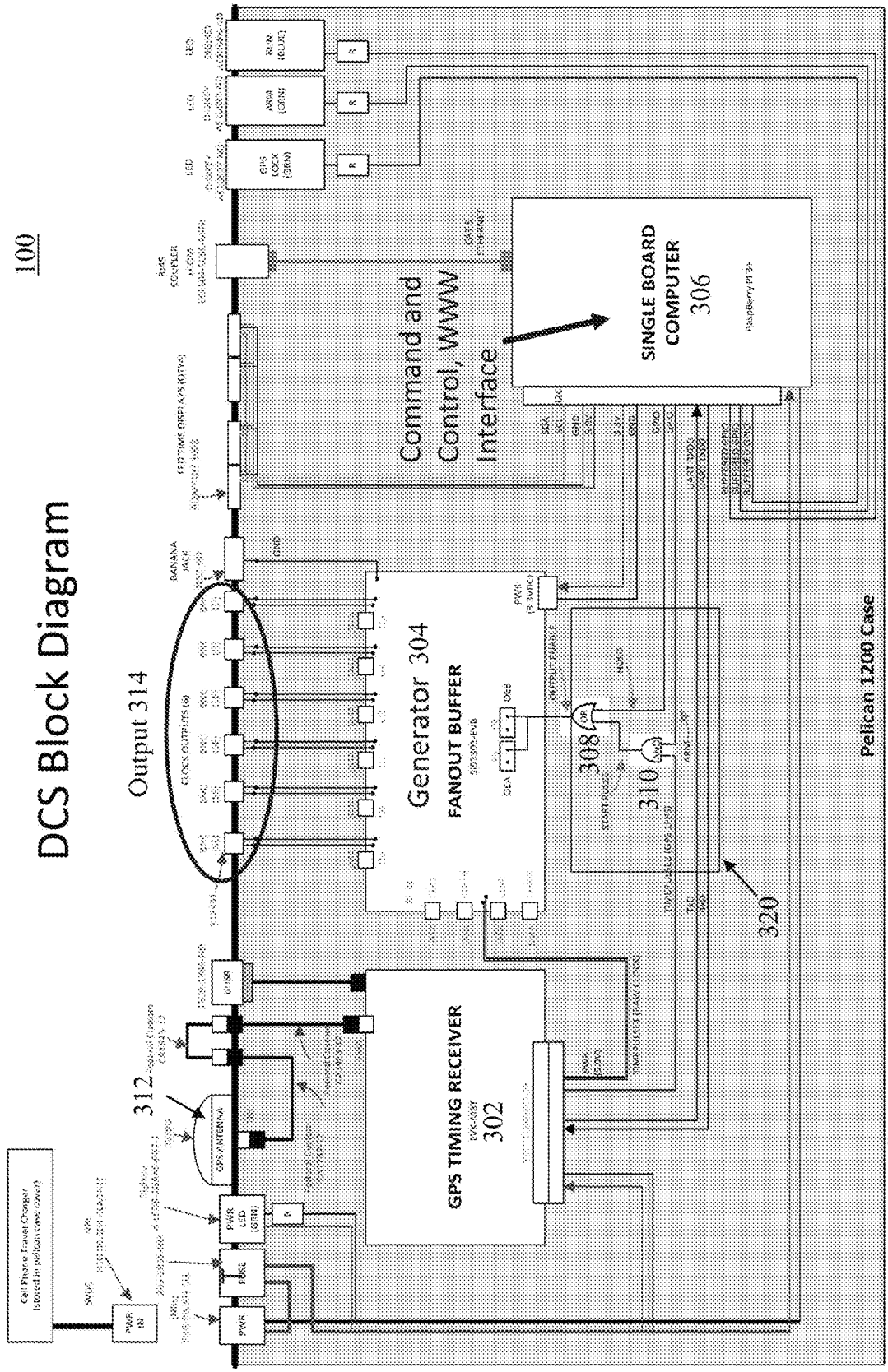
FIG. 3 illustrates an embodiment of a schematic block diagram of components of DCS device, in accordance with disclosed aspects.

FIG. 3 illustrates a block diagram of components of DCS device 100, in accordance with one or more disclosed aspects. DCS device 100 may include a GPS timing receiving circuit 302 (e.g., a GPS receiver device), a generator circuit 304 (e.g., a function generator device), which may in some embodiments be a fanout buffer, and a computing device 306, which may be included in a single board computer, a processor, and/or other type of processing device. GPS timing receiving circuit 302, generator circuit 304, and computing device 306 may communicate with each other by sending and receiving signals to or from another component. In some embodiments, the GPS receiving circuit 302 may be coupled to and/or receive information from a GPS antenna 312.

DCS device 100 may include one or more logic gates, such as OR logic gate 308 (e.g., of the output enabling circuit 320) and logic gate 310, where the output of the AND logic gate 310 may be input into the OR logic gate 308. According to some aspects, the OR logic gate 308 and/or the AND logic gate 310 may be comprised in an output enabling circuit 320.

DCS device may include a housing 322 that may enclose, hold, or coupled to one or more features or components of the DCS device 100. Housing 322 may be, for example, plastic, rubber, or some other material. FIG. 3 illustrates that housing 322 may be a Pelican 1200 Case. Housing 322 may provide for a portable DCS device 100. For example, the DCS device 100 may having a housing 322 that may be about a 20-30 cm×10-25 cm×5-15 cm, such as to, for example, provide for a carrying case for protection and ease of transport and deployment.

FIG. 3 is described in more detail below with respect to FIGS. 4 and 5. In some embodiments, DCS device 100 may include other components, such as those shown in FIG. 3, where some may be conventional or otherwise used to operate the DCS device 100. For example, DCS device 100 may include one or more lights (LED), displays, couplers, ports (USB, Ethernet, and the like), and other components.

Figure 4:
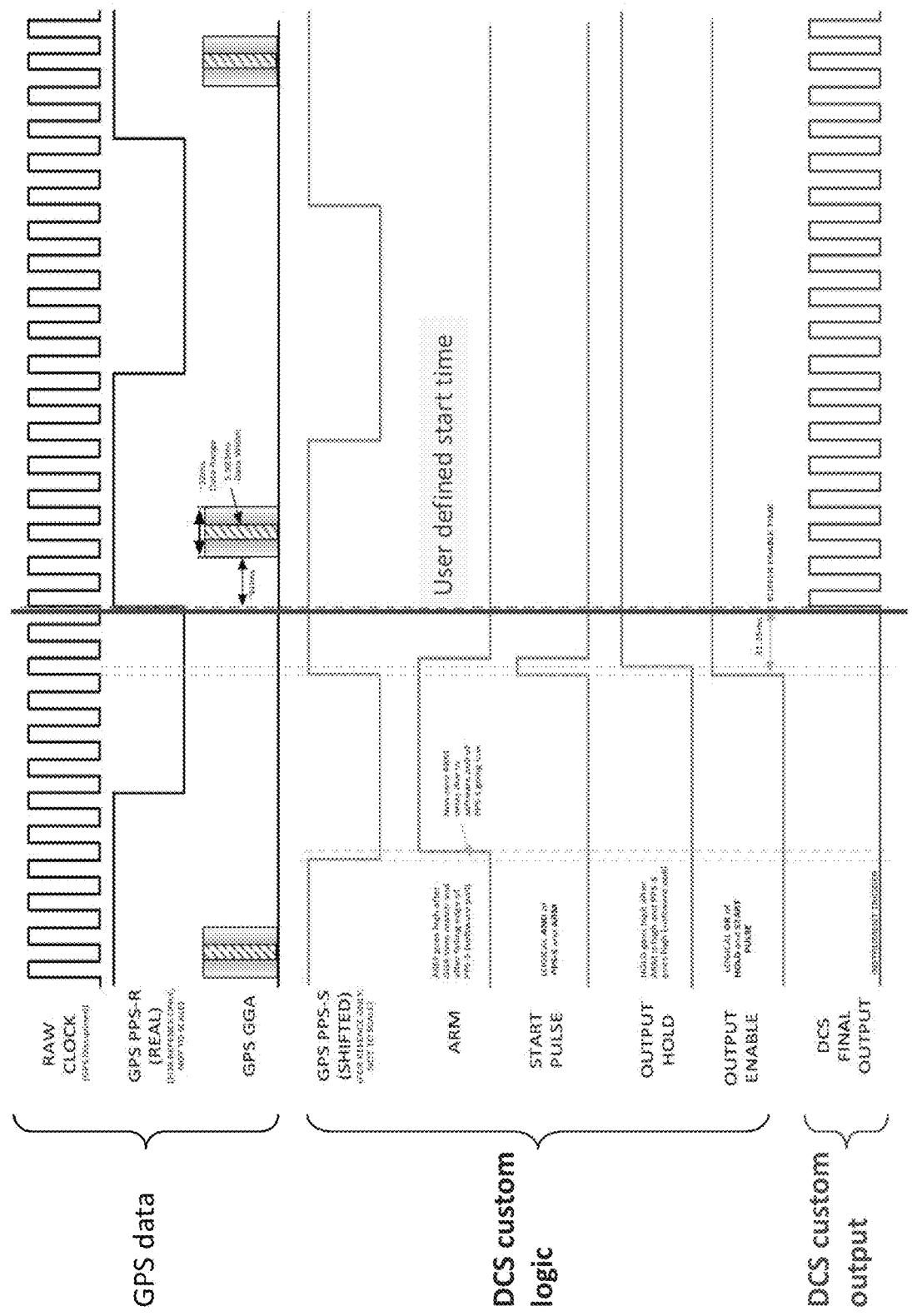
FIG. 4 illustrates an embodiment of a timing diagram describing the operation of the DCS device, in accordance with disclosed aspects.

FIG. 4 illustrates a timing diagram describing the operation of the DCS device 100 in accordance with one or more disclosed aspects. The GPS timing receiving circuit 302 may be used to receive a GPS signal (GPS PPS-R (REAL), as shown in FIG. 4) from a GPS source, such as via a GPS antenna 312. The GPS source may be a GPS satellite, GPS repeater, and the like. According to some aspects, the OPS signal may indicate a current time and may alternate between a low value and a high value (at some frequency)

to indicate time intervals. In some embodiments, the GPS signal may be a CIPS pulse per second (PPS), which may be used the by DCS device 100 to provide an accurate time for a timing sequence (discussed below in more detail). According to some aspects, the time may be provided in UTC time. The GPS timing receiving circuit 302 may lock onto the GPS signal to provide a current time via a GPS GGA signal. In some cases, the GPS GGA signal can provide other information associated with the GPS signal (e.g., satellite information, etc.).

The GPS timing receiving circuit 302 may generate a raw clock signal based on the GPS signal. For example, the clock signal may have a non-zero integer multiple frequency of the frequency of the GPS signal. For example, the frequency of the clock signal may be 14 times more than the frequency of the GPS signal. According to some aspects, the frequency of the clock signal may be greater than the frequency of the GPS signal. The GPS timing receiving circuit 302 may transmit the raw clock signal to the generator circuit 304. The generator circuit 304 may use the raw clock signal to generate an output triggering signal to one or more instruments 102a-d coupled to the DCS device 100.

The GPS timing receiving circuit 302 may be configured to generate a shifted GPS signal (GPS PPS-S (SHIFTED), as shown in FIG. 4) by applying a configurable delay to the received GPS signal. In some cases, the configurable delay may be an n amount of pulses of the raw clock signal, wherein n may be a positive integer. The shifted GPS signal may alternate between a low value and a high value to indicate time intervals that may coincide with the timing intervals of the non-shifted GPS signal, but delayed. According to some aspects, the delay may be received by a user. The delay may provide for a lag in order for the DCS device 100 to generate the triggering pulses before and/or at a next rising edge of the real GPS signal. The delay may compensate or allow for internal system timing (e.g., to cancel or adjust for a buffer circuit turn-on delay time). The delay may be adjusted based on the hardware and is an adjustable delay. The delay is shown on FIG. 4 as the Buffer Enable Time as the vertical line through the timing diagram signals (e.g., 31.25 ms buffer delay time). The GPS timing receiving circuit 302 may output the shifted GPS signal to AND logic gate 310 (e.g., of the output enabling circuit 320). According to some aspects, the GPS timing receiving circuit 302 may transmit the GPS GGA lock signal and/or the shifted GPS signal to the computing device 306.

The computing device 306 may generate, responsive to detecting a falling edge of the shifted GPS signal, an ARM signal having a rising and falling edge. According to some aspects, the computing device 306 may include or be an arming circuit or device. In some cases, the ARM signal may be generated (e.g., a first rising edge) by the computing device 306 after the computing device 306 determines that the GPS GGA time matches and is locked and after a falling edge of the delayed GPS signal. According to some aspects, the ARM signal may have a rising edge after the falling edge of the shifted GPS signal, which may be due to the falling of the delayed GPS signal. The computing device 306 may transmit the ARM signal to the AND logic gate 310 (e.g., of the output enabling circuit 320) (which may also receive the shifted GPS signal from the GPS timing receiving circuit 302, as described above).

The AND logic gate 310 (e.g., of the output enabling circuit 320) may compare the inputted signals (the ARM signal and the shifted GPS signal), and responsive to the ARM signal being high and the shifted GPS signal being high, the AND logic gate 310 (e.g., of the output enabling circuit 320) may generate and output a START PULSE signal (high level) having a rising edge and a falling edge. The AND logic gate 310 (e.g., of the output enabling circuit 320) may output the START PULSE signal to OR logic gate 308 (e.g., of the output enabling circuit 320). According to some aspects, the START PULSE signal may have a rising edge equal to the rising edge of the shifted GPS signal. According to some aspects, the START PULSE may have a falling edge equal to the falling edge of the ARM signal.

The computing device 306 may generate, responsive to and/or after determining that the ARM signal is high and the delayed GPS signal is high an OUTPUT HOLD signal to the OR logic gate 308 (e.g., of the output enabling circuit 320). The OUTPUT HOLD signal may have a rising edge after the rising edge of the START PULSE.

The OR logic gate 310 (e.g., of the output enabling circuit 320) may compare the inputted signals (the OUTPUT HOLD and the START PULSE), and responsive to the OUTPUT HOLD signal or the START PULSE being high, the OR logic gate may generate and output an OUTPUT ENABLE signal (high level) to the generator circuit 304. According to some aspects, the OR logic gate 310 (e.g., of the output enabling circuit 320) may generate and/or output the OUTPUT ENABLE signal (i.e., at a high level) while the START PULSE signal or the OUTPUT HOLD signal is high.

After the generator circuit 304 receives the OUTPUT ENABLE signal, and while the OUTPUT ENABLE signal is high, the generator circuit 304 may generate and transmit a generated clock signal to one or more coupled respective devices 102a-d. For example, the generator circuit 304 may generate and transmit a triggering signal based on the generated clock signal having one or more synchronizing pulses (e.g., one or a plurality) that cause the one or more devices 102a-d to begin sampling data according to the frequency of the generated clock signal. The frequency of the generated clock signal may be based on or equal to the frequency of the raw clock signal.

According to some aspects, the frequency of the raw clock signal (and/or the synchronizing pulses) may be a preset or defined frequency, which may, in some cases, be provided to the DCS device 100 as a the preset frequency via user input (e.g., via interfacing computing system 108). According to some aspects, the OUTPUT ENABLE signal may have a rising edge aligned with a rising edge of the raw clock signal. In some cases, the OUTPUT ENABLE signal may have a rising edge aligned with a rising edge of the shifted GPS signal. In some embodiments, the OUTPUT ENABLE signal may have a rising edge while the GPS signal is low. According to some aspects, the GPS signal may have a frequency lower than a frequency of the raw clock signal.

The generator circuit 304 may begin generating the output triggering signal at a predetermined time, such as a user-defined start time, which may be provided to the DCS device 100 via the interfacing computing system 108. In some cases, while the OUTPUT ENABLE signal is high and before transmitting the triggering signal, the generator circuit 304 may prevent, pause, and/or stop transmitting the triggering signal (e.g., to the one or more devices 102a-d) until a time condition (e.g., the current time matches the user-defined triggering time) or other condition. The generator circuit 304 may begin the transmission of the triggering signal after the current time matches a condition, such as a time condition (e.g., a user-defined triggering time condition) or other condition.

According to some aspects, each device 102a-d may be coupled to a respective clock output 314 (e.g., a respective output port), which may provide the generated clock signal from the generator circuit 304 to a sensing device 102*a-d*. According to some aspects, the OUTPUT ENABLE signal may have a rising edge aligned with a falling edge of a pulse of the raw clock signal. According to some aspects, the OUTPUT ENABLE signal may have a rising edge aligned with a rising edge of the shifted GPS signal. According to some aspects, the OUTPUT ENABLE signal may have a rising edge before the falling edge of the ARM signal, and may stay high after the falling edge of the ARM signal.

After the computing device 306 determines that the current time (based on the GPS signal) equals a predetermined end time, the computing device 306 may set the OUTPUT HOLD signal to low. The predetermined end time may be a user-defined end time. If the START PULSE has gone low at this point, the OUTPUT ENABLE signal may be set to low by the OR logic gate 308 (e.g., of the output enabling circuit 320), where the generator circuit 304 may stop sending the triggering pulse to outputs 314 to stop the sampling of the one or more devices 102*a-d*.

Figure 5:
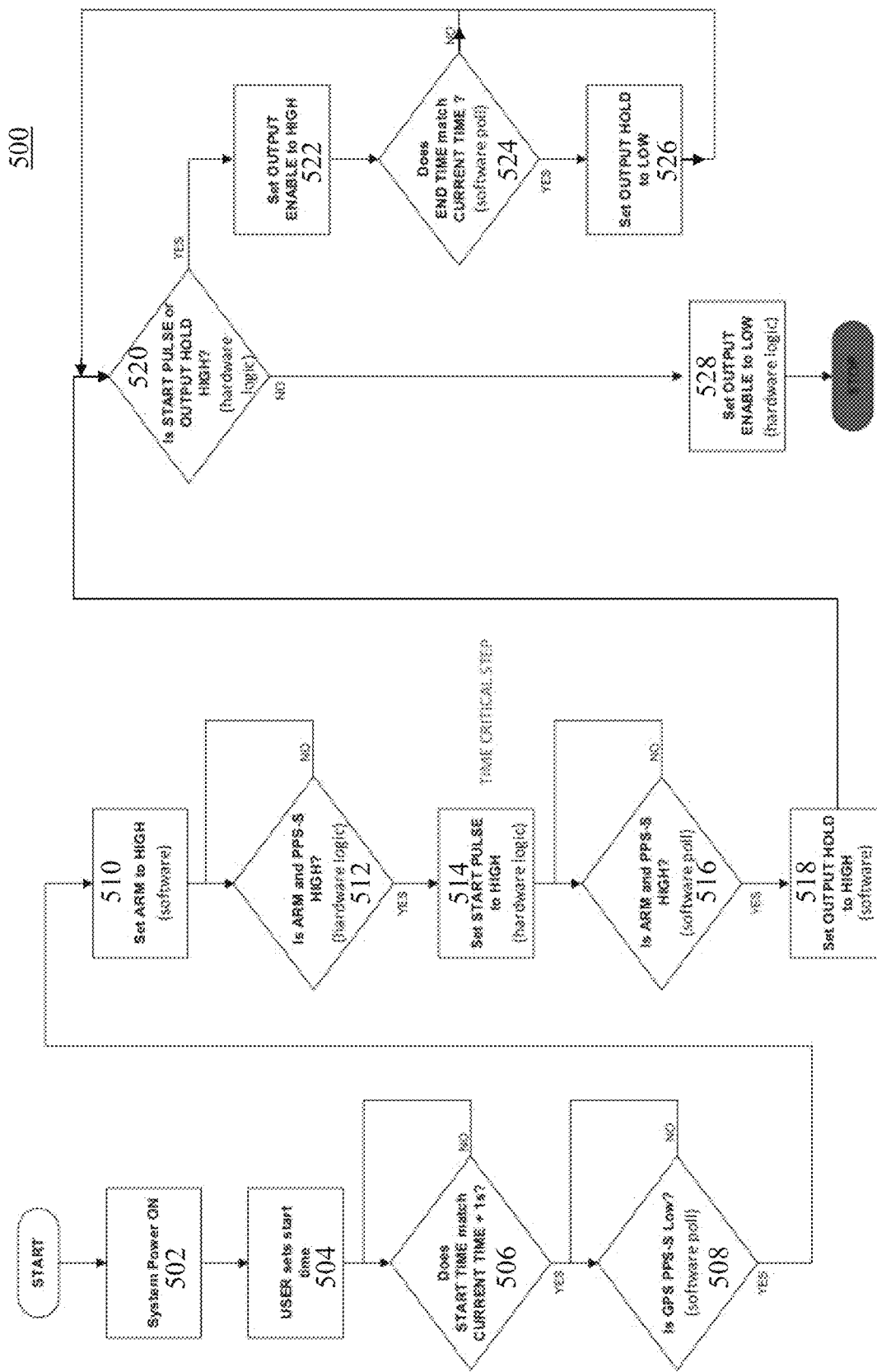
FIG. 5 illustrates an embodiment of a flow diagram illustrating a method for operating a DCS device, in accordance with one or more disclosed aspects.

FIG. 5 illustrates a flow diagram illustrating a process 500 for operating a DCS device 100 in accordance with one or more disclosed aspects. The process may start at step 502, where the DCS device 100 may power on. At step 504, the user may input a start time, such as via interfacing computing system 108, for the DCS device 100 to begin the process of synchronizing one or more instruments 102*a-d* coupled to the DCS device 100.

At step 506, the computing device 306 may determine whether the start time matches the current time plus a fixed offset (e.g., one second), as needed. The computing device 306 may receive the current time from the GPS timing receiving circuit 302 via a GPS GGA lock signal that is based on the received GPS signal. This step is repeated until there is a match, and then the process may proceed to step 508.

At step 508, the computing device 306 may determine whether the shifted GPS signal is low. The computing device 306 may receive the shifted GPS signal from the GPS timing receiving circuit 302. If the computing device 306 determines that the shifted GPS signal is not low (e.g., is high), then step 508 is repeated. If the computing device 306 determines that the shifted. GPS signal is low, then the process may proceed to step 510, where the computing device may generate and set the ARM signal to high. The process may then proceed to step 512.

At step 512, the AND logic gate 310 (e.g., of the output enabling circuit 320) may compare the ARM signal and the shifted GPS signal to determine whether both signals are high. If the AND logic gate 310 (e.g., of the output enabling circuit 320) determines that the ARM signal and the shifted GPS signal are both not high (e.g., at least one signal is low), then step 512 is repeated. If the AND logic gate 310 (e.g., of the output enabling circuit 320) determines that the ARM signal and the shifted GPS signal are both high, then the process may proceed to step 514, where AND logic gate 310 (e.g., of the output enabling circuit 320) may output a high signal for a START PULSE signal to OR logic gate 308 (e.g., of the output enabling circuit 320). The process may then proceed to step 516.

At step 516, the computing device 306 may determine (e.g., via a software poll, etc.) whether the ARM signal and the shifted GPS signal are both high and may set the OUTPUT HOLD signal to high, which may be output to OR logic gate 308 (e.g., of the output enabling circuit 320). At step 520, the OR logic gate 308 (e.g., of the output enabling circuit 320) may compare the OUTPUT HOLD signal and the START PULSE signal to determine whether at least one of the signals is high.

If, at step 520, the OR logic gate 308 (e.g., of the output enabling circuit 320) determines that at least one of the OUTPUT HOLD signal or the START PULSE signal is high, then the process may proceed to step 522, where the OR logic gate 308 (e.g., of the output enabling circuit 320) may output a high signal for an OUTPUT ENABLE signal to the generator circuit 304. While the OUTPUT ENABLE signal is high, the generator circuit 304 may generate and transmit a triggering signal of one or more synchronizing pulses to one or more coupled respective devices 102*a-d*, which may instruct and/or cause the devices 102*a-d* to sample data according to the frequency of the triggering pulses.

The synchronizing pulses may be in accordance with a generated clock signal, where the generated clock signal may be based on a raw clock signal generated by the GPS timing receiving circuit 302 based on the GPS signal. The generator circuit 304 may transmit the pulses to the one or more devices 102*a-d* via clock outputs 314. According to some aspects, the plurality of synchronizing pulses may be edge-aligned with the GPS signal at predetermined equal intervals (e.g., every second).

In some embodiments, the sampled data from the one or more devices 102*a-d* may be received and/or analyzed. For example, the one or more devices 102*a-d* may transmit the sampled data to the DCS device 100, which may receive the sampled data from the one or more devices 102*a-d*. In some cases, the interfacing computing system 108 (or other computing device) may receive the sampled data, such as directly from the one or more devices 102*a-d* and/or via the DCS device 100. According to some aspects, the one or more devices 102*a-d*, may store the sampled data, where the stored data may be transferred or used at a later time. In some cases, the DCS device(s) 100 or the interfacing computing system 108 may use the sampled data to refine one or more of the signals used in the timing diagram, such as to improve or further implement the synchronization pulses and/or timing.

At step 524, the computing device 306 may determine (e.g., via a software poll) whether the current time matches an end time that may have been predetermined and/or preset and input by a user. If, at step 524, the computing device determines that the current time does not match the end time, then the process may return to step 520. If, at step 524, the computing device determines that the current time matches the end time, then the process may proceed to step 526. At step 526, the computing device 306 may set the OUTPUT HOLD signal to low, and the process may return to step 520.

If, at step 520, the OR logic gate 308 (e.g., of the output enabling circuit 320) determines that both of the OUTPUT HOLD signal and the START PULSE signal are not high (e.g., both are low), then the process may proceed to step 528, where the OR logic gate 308 (e.g., of the output enabling circuit 320) may generate and set the OUTPUT ENABLE signal to low. Because the OUTPUT ENABLE signal is low, the generator circuit 304 may stop transmitting the triggering signal of one or more synchronizing pulses to one or more coupled respective devices 102*a-d*. This may signal to and/or cause the one or more devices 102*a-d* to stop sampling data. The process may end.

Figure 6:
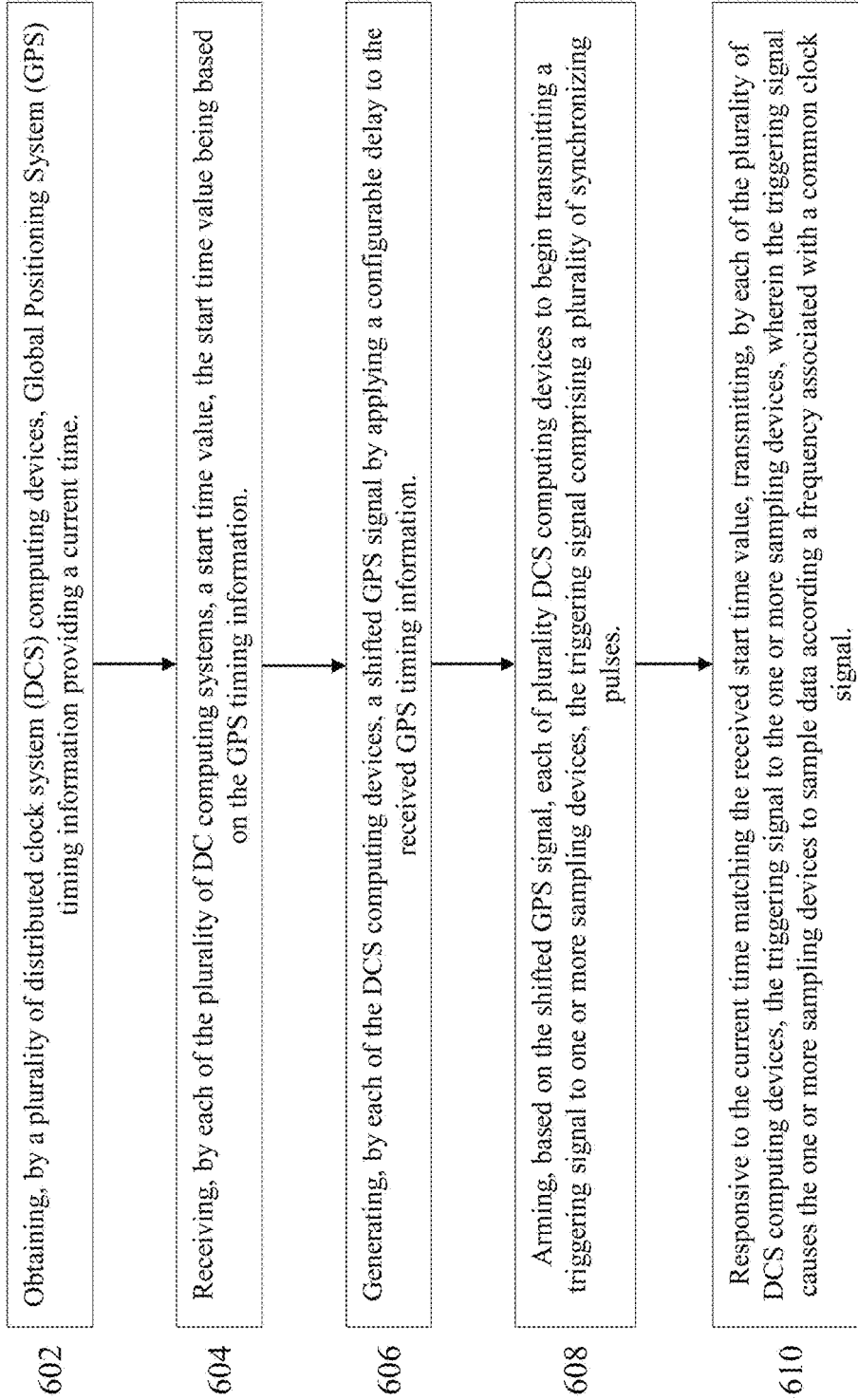
FIG. 6 illustrates an embodiment of a flow diagram illustrating a method for operating a plurality of DCS devices, in accordance with one or more disclosed aspects.

FIG. 6 illustrates a flow diagram illustrating a process 600 for operating a plurality of DCS devices 100 in accordance with one or more disclosed aspects. One or more steps of process 600 may include one or more features such as described herein, such as described with respect to the timing diagram shown in and described with respect to FIG. 4 and/or to process 500. Process 600 may begin at step 602.

At step 602, a plurality of DCS devices 100 may obtain GPS timing information providing a current time. At step 604, the DCS devices 100 may receive a start time value, the start time value being based on the GPS timing information. At step 606, the DCS devices 100 may generate a shifted GPS signal by applying a configurable delay to the received GPS timing information. At step 608, the DCS devices 100 may be armed to begin transmitting a triggering signal to one or more respective devices 102a-d (e.g., sampling devices), the triggering signal comprising one or more synchronizing pulses. At step 610, the DCS devices 100 may transmit, responsive to the current time matching the received start time value, the triggering signal to the one or more respective devices 102a-d (e.g., sampling devices), wherein the triggering signal causes the one or more respective devices 102a-d (e.g., sampling devices) to sample data according a frequency associated with a common clock signal. The process may end.

According to some aspects, the DCS devices 100 may receive the sampled data from the respective one or more respective devices 102a-d (e.g., sampling devices), wherein the sampled data may be temporally aligned based on the common clock signal. In some embodiments, the received sampled data may include data sampled according the frequency associated with the common clock signal. In some cases, the DCS devices 100 may receive an end time value, and may pause, responsive to the current time matching the end time value, the transmission of the triggering signal.

Figure 7:
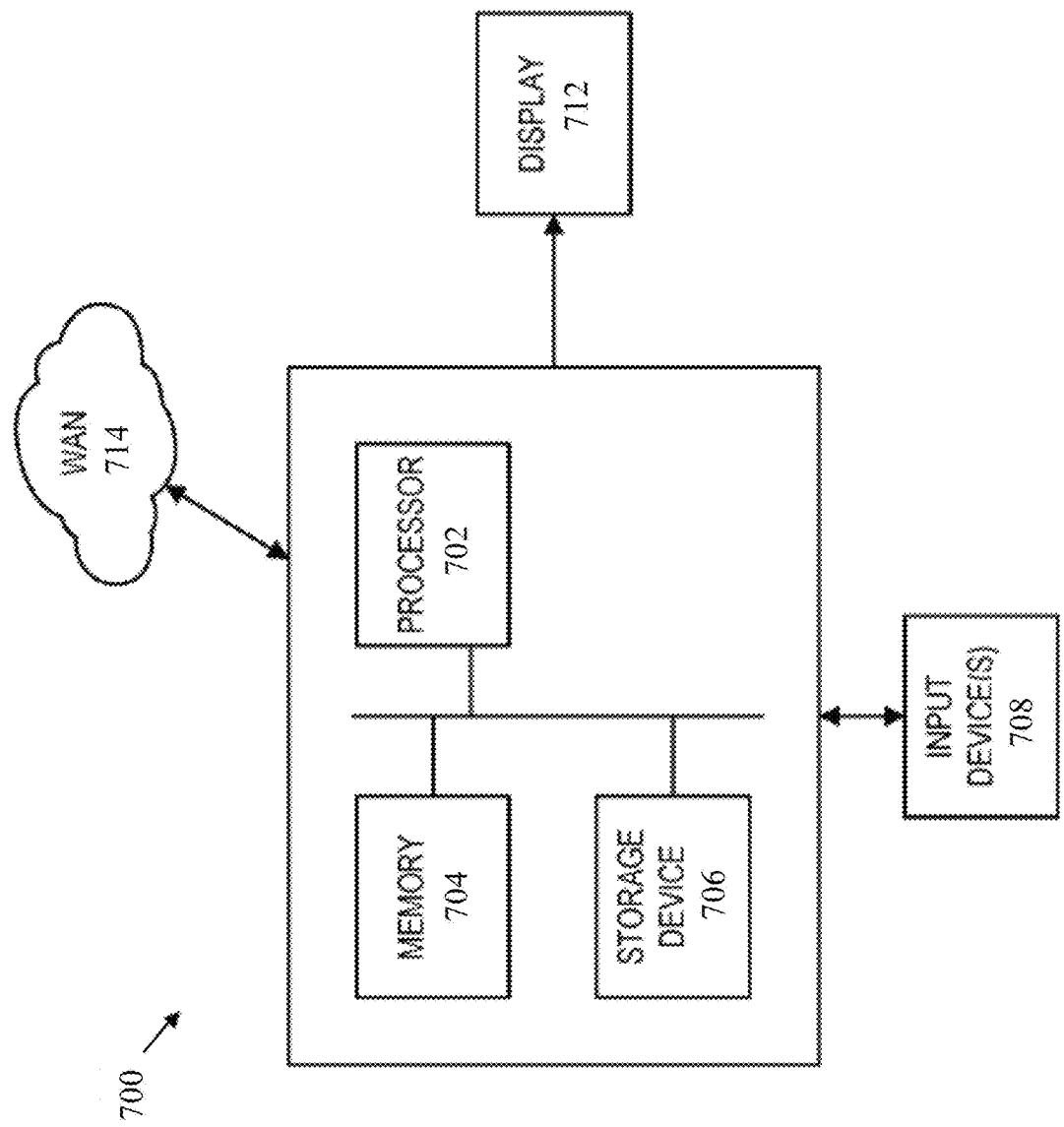
FIG. 7 illustrates a diagram of an example computer system, in accordance with one or more disclosed aspects.

One or more aspects described herein may be implemented on virtually any type of computer regardless of the platform being used. For example, as shown in FIG. 7, a computer system 700 includes a processor 702, associated memory 704, a storage device 706, and numerous other elements and functionalities typical of today's computers (not shown). The computer 700 may also include input means 708, such as a keyboard and a mouse, and output means 712, such as a monitor or LED. The computer system 700 may be connected to a local area network (LAN) or a wide area network (e.g., the Internet) 714 via a network interface connection (not shown). Those skilled in the art will appreciate that these input and output means may take other forms.

Further, those skilled in the art will appreciate that one or more elements of the aforementioned computer system 700 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device.

A Distributed Clock System (DCS), which may include one or more DCS devices and may be used to assist with synchronization of similar or disparate data acquisition systems has been described. Although particular embodiments, aspects, and features have been described and illustrated, one skilled in the art would readily appreciate that the aspects described herein is not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What is claimed is:

1. A method, comprising:
receiving, by a Global Positioning System (GPS) timing receiving circuit of a distributed clock system (DCS) device, a GPS signal from a GPS source, the GPS signal indicating time including a current time, the GPS signal alternating between a low value and a high value, wherein the GPS signal has a frequency lower than a frequency of a raw clock signal;
determining, by the GPS timing receiving circuit and based on the received GPS signal, that a first current time equals a predetermined start time;
generating, by the GPS timing receiving circuit, a shifted GPS signal by applying a configurable delay to the received GPS signal, the shifted GPS signal alternating between a low value and a high value;
responsive to a falling edge of the shifted GPS signal, generating, by an arming circuit of the DCS device, an ARM signal having a rising edge after the falling edge of the shifted GPS signal;
responsive to the ARM signal being high and the shifted GPS signal being high, generating, by an output enabling circuit of the DCS device, an output enable signal; and
transmitting, by a generator circuit of the DCS device, while the output enable signal is high, a triggering signal to one or more sampling devices, the triggering signal comprising one or more synchronizing pulses that cause the one or more sampling devices to sample data according to the frequency of the raw clock signal.

2. The method of claim 1, further comprising:
generating, by the GPS timing receiving circuit, the raw clock signal by clock dividing the GPS signal, wherein the frequency of the raw clock signal comprises an integer multiple of the frequency of the GPS signal.

3. The method of claim 2, wherein the frequency of the raw clock signal is a preset frequency, wherein the preset frequency is provided to the DCS device via user input.

4. The method of claim 1, wherein transmitting the triggering signal further comprises transmitting a respective one of the one or more respective triggering signals to the one or more sampling devices via a respective clock output port.

5. The method of claim 1, wherein the one or more synchronizing pulses are edge-aligned with the GPS signal at predetermined equal intervals.

6. The method of claim 5, wherein each of the predetermined equal intervals is a second.

7. The method of claim 1, further comprising:
determining, while transmitting the triggering signal and based on the received GPS signal, that a second current time equals a predetermined end time; and
setting the output enable signal to low.

8. The method of claim 1, wherein generating the output enable signal comprises:

generating (1) a start pulse signal having a rising edge equal to a rising edge of the GPS signal and (2) an output hold signal having a rising edge after the rising edge of the start pulse signal; and generating the output enable signal while the start pulse signal or the output hold signal is high.

9. The method of claim 8, wherein the start pulse signal comprises a falling edge equal to a falling edge of the ARM signal.

10. The method of claim 1, further comprising receiving the GPS signal via a GPS repeater device and a GPS antenna.

11. The method of claim 1, the method further comprising:

while the output enable signal is high and before transmitting the triggering signal, preventing the transmission of the triggering signal to the one or more sampling devices until the current time matches a user-defined triggering time; and starting the transmission of the triggering signal after the current time matches the user-defined triggering time.

12. The method of claim 1, wherein generating the output enable signal comprises generating the output enable signal having a rising edge: (1) aligned with a first rising edge of the raw clock signal, (2) aligned with a rising edge of the shifted GPS signal, and (3) while the GPS signal is low.

13. The method of claim 1, wherein the configurable delay comprises an n amount of pulses of the raw clock signal, wherein n is a positive integer.

14. A method, comprising:

obtaining, by a plurality of distributed clock system (DCS) computing devices, Global Positioning System (GPS) timing information providing a current time;

receiving, by each of the plurality of DCS computing systems, a start time value, the start time value being based on the GPS timing information;

generating, by each of the DCS computing devices, a shifted GPS signal by applying a configurable delay to the received GPS timing information;

arming, based on the shifted GPS signal, each of the plurality of DCS computing devices to begin transmitting a triggering signal to one or more sampling devices, the triggering signal comprising one or more synchronizing pulses; and responsive to the current time matching the received start time value, transmitting, by each of the plurality of DCS computing devices, the triggering signal to the one or more sampling devices, wherein the triggering signal causes the one or more sampling devices to sample data according to a frequency associated with a common clock signal.

15. The method of claim 14, further comprising receiving, by each of the plurality of DCS computing devices, the sampled data from the respective one or more sampling devices, wherein the sampled data is temporally aligned based on the common clock signal.

16. The method of claim 15, wherein the received sampled data comprises data sampled according to the frequency associated with the common clock signal.

17. The method of claim 14, further comprising:

receiving, by each of the plurality of DCS computing devices, an end time value; and responsive to the current time matching the end time value, pausing, by each of the plurality of DCS computing devices, the transmission of the triggering signal.

18. The method of claim 14, further comprising:

obtaining the GPS timing information via a GPS repeater device and a GPS antenna.

19. A distributed clock system (DCS) device, comprising:

a Global Positioning System (GPS) timing receiving circuit configured to:

receive a GPS signal from a GPS source, the GPS signal indicating time including a current time, the GPS signal alternating between a low value and a high value, wherein the GPS signal has a frequency lower than a frequency of a raw clock signal, determine that a first current time equals a predetermined start time, and generate a shifted GPS signal by applying a configurable delay to the received GPS signal, the shifted GPS signal alternating between a low value and a high value;

an arming circuit configured to generate, responsive to a falling edge of the shifted GPS signal, an ARM signal having a rising edge after the falling edge of the shifted GPS signal;

an output enabling circuit configured to generate, responsive to the ARM signal being high and the shifted GPS signal being high, an output enable signal; and a generator circuit configured to transmit, while the output enable signal is high, a triggering signal to one or more sampling devices, the triggering signal comprising one or more synchronizing pulses that cause the one or more sampling devices to sample data according to the frequency of the raw clock signal.

20. The DCS device of claim 19, further comprising one or more clock output ports configured to output a respective one of one or more respective triggering signals to the one or more sampling devices.

* * * * *